(12) United States Patent
Basov et al.

(10) Patent No.: US 9,430,331 B1
(45) Date of Patent: Aug. 30, 2016

(54) RAPID INCREMENTAL BACKUP OF CHANGED FILES IN A FILE SYSTEM

(75) Inventors: Ivan Basov, Brookline, MA (US); Jean-Pierre Bono, Westboro, MA (US); Morgan Clark, South Orange, NJ (US); Christopher H. Stacey, Chistchurch (NZ)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/550,481

(22) Filed: Jul. 16, 2012

(51) Int. Cl.
*G06F 17/00* (2006.01)
*G06F 11/14* (2006.01)

(52) U.S. Cl.
CPC ................. *G06F 11/1451* (2013.01)

(58) Field of Classification Search
CPC ........... G06F 11/2094; G06F 11/1438; G06F 17/30088
USPC ....................................... 707/646
See application file for complete search history.

(56) References Cited

U.S. PATENT DOCUMENTS

| | | | |
|---|---|---|---|
| 5,133,065 A | 7/1992 | Cheffetz et al. | |
| 5,771,354 A | 6/1998 | Crawford | |
| 6,477,629 B1 | 11/2002 | Goshey et al. | |
| 7,206,795 B2 | 4/2007 | Bono | |
| 7,412,496 B2 | 8/2008 | Fridella et al. | |
| 7,555,504 B2 | 6/2009 | Bixby et al. | |
| 7,653,624 B1 | 1/2010 | Reitmeyer et al. | |
| 7,774,315 B1 * | 8/2010 | Galker .......................... | 707/644 |
| 7,801,859 B1 | 9/2010 | Desai et al. | |
| 7,831,789 B1 * | 11/2010 | Per et al. ....................... | 711/162 |
| 7,913,044 B1 * | 3/2011 | Desai et al. ................... | 711/162 |
| 7,974,952 B1 | 7/2011 | Reitmeyer et al. | |
| 8,046,333 B1 * | 10/2011 | Wang ................ | G06F 17/30091 707/646 |
| 8,051,044 B1 * | 11/2011 | Dyatlov et al. ............... | 707/646 |
| 8,099,572 B1 | 1/2012 | Arora et al. | |
| 8,244,903 B2 | 8/2012 | Bono | |
| 8,655,848 B1 * | 2/2014 | Leverett ............ | G06F 17/30088 707/660 |
| 2003/0200480 A1 | 10/2003 | Beattie | |
| 2004/0163009 A1 | 8/2004 | Goldstein et al. | |
| 2004/0268068 A1* | 12/2004 | Curran et al. ................. | 711/162 |

(Continued)

OTHER PUBLICATIONS

Vahalia, Uresh, Unix Internals—The New Frontiers, Chapter 9, File System Implementations, 1996, pp. 261-290, Prentice-Hall, Inc., Upper Saddle River, NJ.

(Continued)

*Primary Examiner* — Mariela Reyes
*Assistant Examiner* — Courtney Harmon
(74) *Attorney, Agent, or Firm* — Krishnendu Gupta; Jason A. Reyes; Deepika Bhayana

(57) ABSTRACT

Directory attributes are provided so that the time for creating an incremental backup of a file system by a scan of the file system tree is proportional generally to the number of files that change between backups instead of the number of files in the file system. A tree modification attribute indicates whether or not any file in a directory tree has changed since the last backup. If no file has changed in the directory tree, then the entire tree is skipped during the scan for changed files. In addition, a list is compiled of the files in the directory that represent branches having at least one changed file, so that the list is scanned instead of the directory entries. When a file is changed for the first time since the last backup, the file is queued so that the directory attributes are updated in a background process.

15 Claims, 13 Drawing Sheets

(56) References Cited

U.S. PATENT DOCUMENTS

2007/0226436 A1    9/2007    Cheng et al.
2012/0078855 A1*   3/2012    Beatty et al. ................. 707/676

OTHER PUBLICATIONS

R. Stager and D. Hitz, Internet Draft filename "draft-stager-iquard-netapp-backup-05.txt," Network Data Management Protocol (NDMP), last update Oct. 12, 1999, pp. 1-73, Internet Engineering Task Force, Fremont, CA.

Efficient Data Protection with EMC Avamar Global Deduplication Software, White Paper, Jan. 2010, 19 pages, EMC Corporation, Hopkinton, MA.

Zhu, Ningning, "Data Versioning Systems," Research Proficiency Exam Report, ECSL Technical reports (TR-131), www.ecsl.cs.sunysb.edultech_reports.html, 33 pages, Feb. 2003, Computer Science Department, Stony Brook University, Stony Brook, NY.

P. Ram and D. Lyman, "Extracting Delta for Incremental Data Warehouse Maintenance," 16th International Conference on Data Engineering, San Diego, CA, Feb. 28- Mar. 3, 2000, Proceedings, pp. 220-229, IEEE Computer Society, IEEE, New York, NY.

* cited by examiner

RAPID INCREMENTAL BACKUP OF CHANGED FILES IN A FILE SYSTEM

FIELD OF THE INVENTION

The present invention relates to incremental backup of changed files in a file system.

BACKGROUND OF THE INVENTION

Incremental backup of files in a file system is a well-known technique for enabling recovery of files that have become corrupted or entirely lost from data storage due to disk drive failure or destruction from a disaster. The technique begins by performing a full backup of the file system by copying all of the files in the file system to backup storage such as magnetic tape. Then, at periodic intervals or when requested by a user, the file system is scanned for files that have changed since the last backup, and each file that has changed since the last backup is copied to the backup storage.

Typically the file system tree is scanned in a depth-first fashion, starting at the root directory, to find files that have changed since the last backup and to copy each of these changed files to the backup storage. For example, for each file visited during the depth-first scan, the time of the start of the scan for the last backup is compared to a modification time attribute (mtime) and a creation time attribute (ctime) to determine whether or not the file's data or metadata has been changed since the time of the last backup. If so, then the changed file is copied to the backup storage. The depth-first scan is continued until the entire file system tree is scanned. The incremental backup is finished when all of the changed files have been copied to the backup storage.

SUMMARY OF THE INVENTION

The present invention recognizes that there are disadvantages as well as advantages associated with the conventional method of incremental backup of files in a file system. The disadvantages have become more pronounced as file systems have grown in size and users have become less diligent in removing old and infrequently accessed files from on-line storage due to the ever decreasing cost of storage. Incremental backups, however, are still performed at frequent intervals. Consequently, a greater amount of time is spent scanning the file system tree for files that have changed since the last backup. This increase in scanning time interferes with concurrent client access to the file system and may also lead to increased processing load or inefficiency in the backup process due to the handling of files that are changed during the scanning process. However, users expect changed files to be backed up in the order that they appear in a depth-first scan of the file system tree. Users also would like to continue to use their conventional recovery software for restoring on-line storage to the state existing at the time of a selected incremental backup by using the initial full backup and following incremental backups up to the time of the selected incremental backup. Therefore there is a need for accelerating the top-down search for changed files in the process of making an incremental backup of changed files in the file system.

In accordance with a first aspect, the invention provides a method of operating a digital computer to create an incremental backup of a file system in data storage. The file system has a tree of directories and regular files. The method includes a data processor of the digital computer executing computer instructions stored in a non-transitory computer readable storage medium to perform file system access and incremental backup of the file system after a last backup time. The file system access and incremental backup is performed by the steps of: (a) changing files in the file system after the last backup time, and setting directory attributes for accelerating a top-down search of the tree of the file system for the files that have been changed since the last backup time; and then (b) performing the top-down search of the tree of the file system for the files that have been changed since the last backup time, and the top-down search finding the files that have been changed since the last backup time, and copying, from the data storage to backup storage, the files found by the top-down search to have been changed since the last backup time. The top-down search includes accessing the directory attributes for accelerating the top-down search in order to exclude, from the top-down search, some files that have not been changed since the last backup time.

In accordance with another aspect, the invention provides a method of operating a digital computer to create an incremental backup of a file system in data storage. The file system has a tree of directories and regular files. The method includes a data processor of the digital computer executing computer instructions stored in a non-transitory computer readable storage medium to perform the steps of: (a) determining that a file is being changed by a file system access operation for a first time since a last backup time, and upon determining that a file is being changed by a file system access operation for a first time since the last backup time, placing the file in a queue, and servicing the queue in background to update directory attributes for accelerating a top-down search of the tree of the file system for files that have been changed since the last backup time; and then (b) performing the top-down search of the tree of the file system for files that have been changed since the last backup time, and the top-down search finding files that have been changed since the last backup time, and the top-down search accessing the directory attributes for accelerating the top-down search of the file system in order to exclude, from the top-down search, some files that have not been changed since the last backup time, and to exclude, from the top-down search, some directories that do not include any file that has been changed since the last backup time, and copying, from the data storage to backup storage, the changed files found during the top-down search. The directory attributes for accelerating the top-down search include directory tree modification attributes indicating whether or not directory trees in the tree of the file system have any file that has been changed since the last backup time. Moreover, step (b) includes finding, during the top-down search of the tree of the file system, at least one of the directory tree modification attributes indicating that a directory tree in the tree of the file system does not have any file that has been changed since the last backup time, and excluding, from the top-down search, files of this directory tree indicated as not having any file that has been changed since the last backup time. Furthermore, the directory attributes for accelerating the top-down search include lists of files that need to be searched in the directories in order for the top-down search of the file system to find all of the files that have been changed since the last backup time. The lists of files that need to be searched in the directories exclude files that are in the directories and do not need to be searched in order for the top-down search to find all of the files that have been changed since the last backup time.

In accordance with a final aspect, the invention provides a digital computer including data storage storing a file system having a tree of directories and regular files, a non-transitory computer readable storage medium storing computer instructions, and a data processor coupled to the data storage for reading and writing to the directories and regular files in the file system, and coupled to the non-transitory computer readable storage medium for executing the computer instructions. The computer instructions, when executed by the data processor, perform file system access and incremental backup of the file system after a last backup time. The file system access and incremental backup is performed by the steps of: (a) changing files in the file system after the last backup time, and setting directory attributes for accelerating a top-down search of the tree of the file system for the files that have been changed since the last backup time; and then (b) performing the top-down search of the tree of the file system for files that have been changed since a last backup time, and the top-down search finding the files that have been changed since the last backup time, and copying, from the data storage to backup storage, the files found by the top-down search to have been changed since the last backup time. The top-down search includes accessing the directory attributes for accelerating the top-down search in order to exclude, from the top-down search, some files that have not changed since the last backup time.

BRIEF DESCRIPTION OF THE DRAWINGS

Additional features and advantages of the invention will be described below with reference to the drawings, in which.

Figure 1:
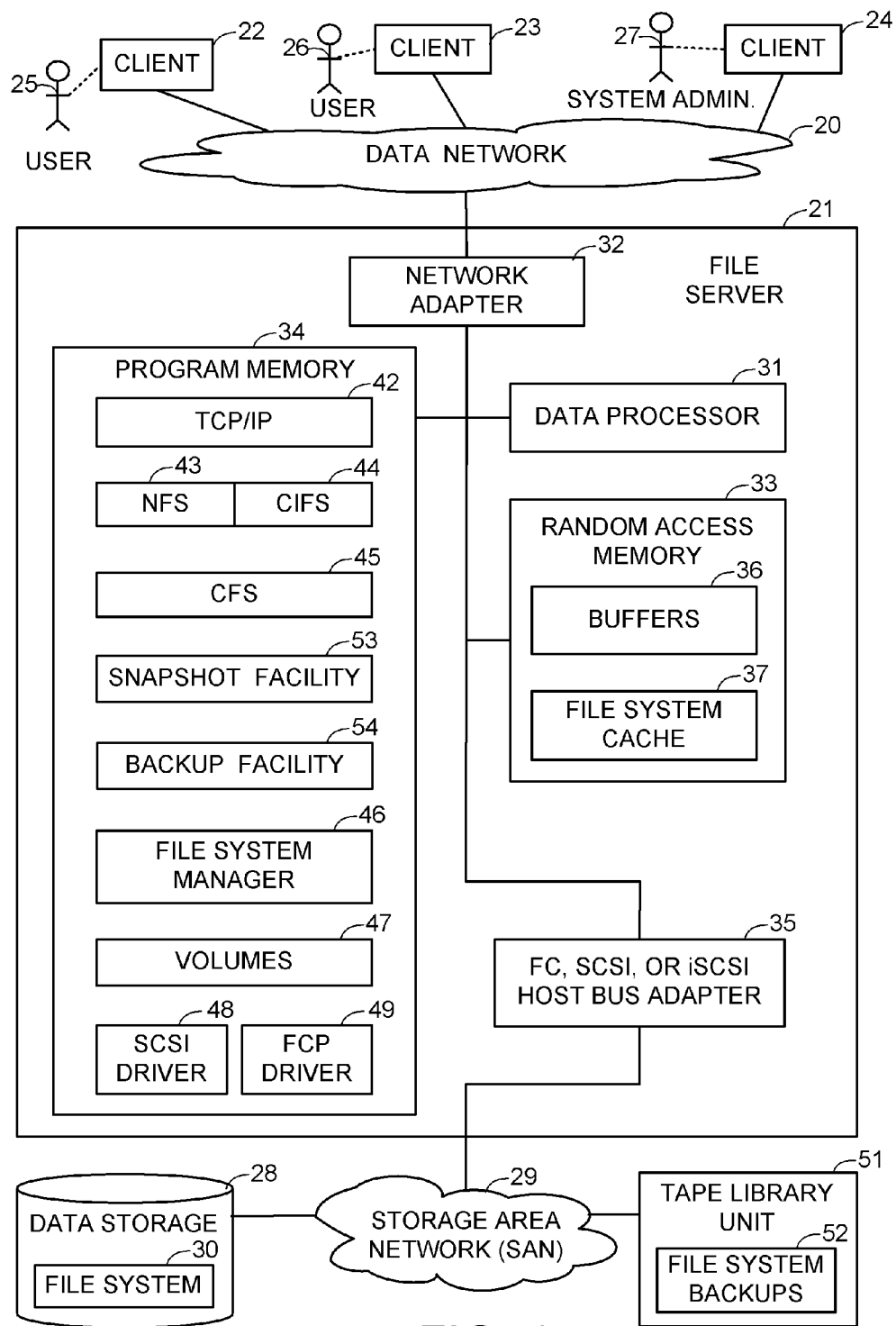
FIG. 1 is block diagram of a data processing system using the present invention.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data network 20 including a file server 21 for servicing file access requests from network clients 22, 23, 24. The network clients 22, 23, 24, for example, are workstations operated by respective human users 25, 26, 27. The file server 21 is linked to data storage 28 via a storage area network (SAN) 29. The data storage 28, for example, is an array of disk drives. The file server 21, storage area network 29, and data storage 28 together comprise a special-purpose digital computer for servicing file system access requests from the clients 22, 23, 24 for read/write access to files in a file system 30 in the data storage 28.

The file server 21 includes a data processor 31, a network adapter 32 linking the data processor to the data network 20, random access memory 33, program memory 34, and a Fibre-Channel (FC), Small Computer Systems Interface (SCSI), or Internet Protocol SCSI (iSCSI) host bus adapter 35 linking the data processor to the storage area network (SAN) 29. The data processor 31 is a general purpose digital computer data processor including one or more core central processing units (CPUs) for executing computer program instructions stored in the program memory 34. The program memory 34 is a non-transitory computer readable storage medium, such as electrically erasable and programmable read-only memory (EEPROM). The random access memory 33 includes buffers 36 and a file system cache 37.

The program memory 34 includes a program layer 42 for network communication using the Transmission Control Protocol (TCP) and the Internet Protocol (IP). The program memory also includes a Network File System (NFS) module 43 for supporting file access requests using the NFS file access protocol, and a Common Internet File System (CIFS) module 44 for supporting file access requests using the CIFS file access protocol.

The NFS module 43 and the CIFS module 44 are layered over a Common File System (CFS) module 45. The CFS module 45 is layered over a file system manager module 46. The file system manager module 46 supports a UNIX-based file system, and the CFS module 45 provides higher-level functions common to NFS and CIFS. For example, the file system manager module 46 maintains the file system 30 in the data storage 28, and maintains the file system cache 37 in the random access memory 33. The conventional organization and management of a UNIX-based file system is described in Uresh Vahalia, Unix Internals—The New Frontiers, Chapter 9, File System Implementations, pp. 261-290, Prentice-Hall, Inc., Upper Saddle River, N.J. (1996).

The program memory 34 further includes a logical volumes layer 47 providing a logical volume upon which the file system 30 is built. The logical volume is configured from the data storage 28. For example, the logical volume is configured from one or more logical unit numbers (LUNs) of the data storage 28. The logical volumes layer 47 is layered over a SCSI driver 48 and a Fibre-Channel protocol (FCP) driver 49 in order to access the logical unit numbers (LUNs) in the storage area network (SAN) 29. The data processor 31 sends storage access requests through the host bus adapter 35 using the SCSI protocol, the iSCSI protocol, or the Fibre-Channel protocol, depending on the particular protocol used by the storage area network (SAN) 29.

The present invention more particularly concerns incremental backup of the file system 30 so that the file system can be restored in the event that the file system 30 becomes inaccessible or corrupted due to a hardware or software failure, user error, or malicious computer code such as a computer virus. For incremental backup of the file system 30, the storage area network 29 links the file server 21 to a backup storage unit such as a tape library unit 51 storing file system backups 52. To create the file system backups 52 from the file system 30, the program memory 34 of the file server 21 includes a snapshot facility program 53 and a backup facility program 54.

Figure 2:
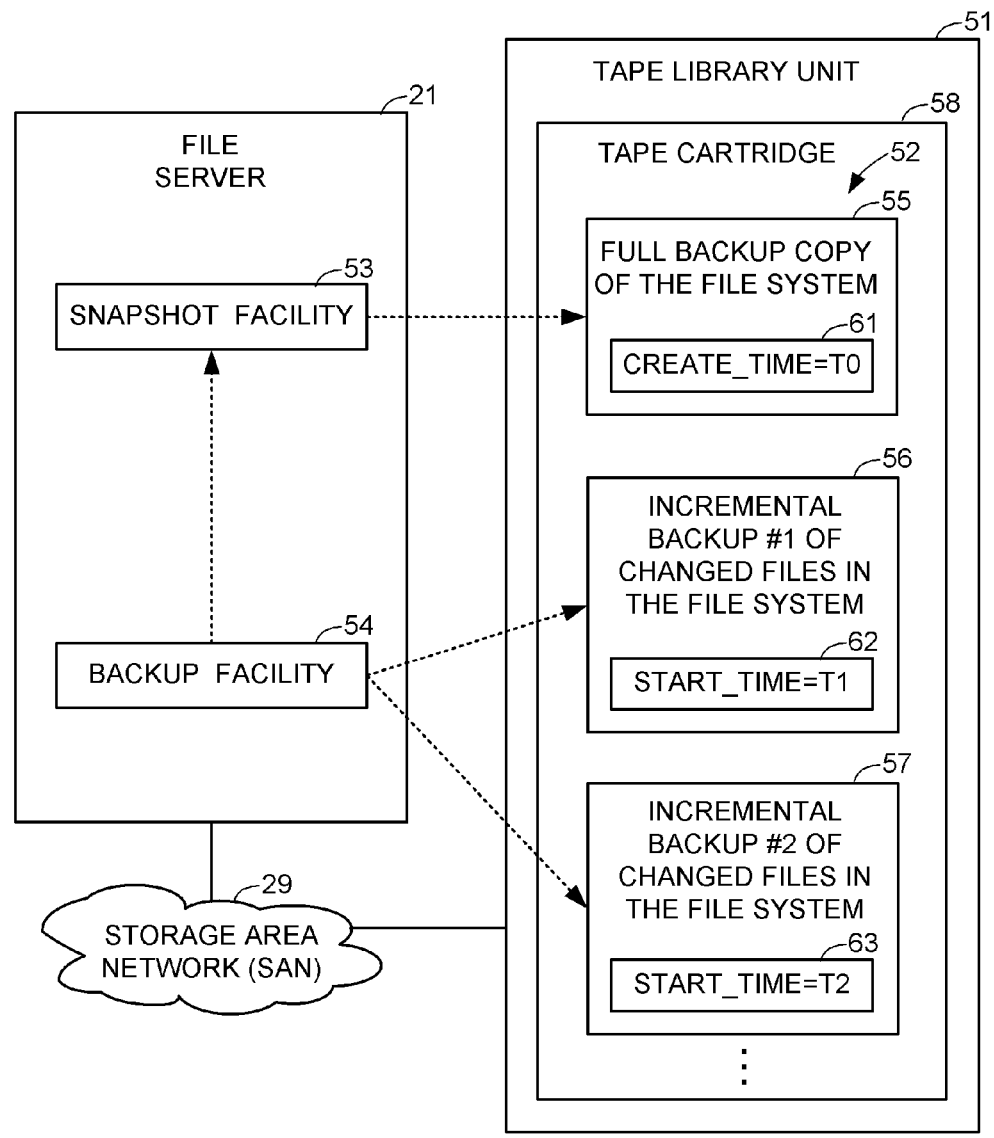
FIG. 2 is a bock diagram showing an initial full backup and following incremental backups of a file system shown in FIG. 1.

FIG. 2 shows details of the file system backups 52. The file system backups 52 are stored in a tape cartridge 58 in the tape library unit 51. The backups 52 include an initial full backup copy 55 of the file system. The full backup copy 55 of the file system is a snapshot copy produced by the snapshot facility 53. This snapshot copy is the state of the file system (30 in FIG. 1) existing at certain creation time 61 that is stored in association with the full backup copy 55. The snapshot facility 53 has the capability of giving clients (22, 23, 24 in FIG. 1) read-write access to the file system (30 in FIG. 1) in the data storage (28 in FIG. 1) while maintaining the state of the file system existing at the snapshot creation time.

In general, the snapshot facility 53 maintains the state of the file system existing at the snapshot creation time by keeping a record of whether or not each data block of the file system has been changed since the snapshot creation time. For each write operation upon the file system, if a data block being written to has not been changed since the snapshot creation time, then this "old" value of this data block is saved before a "new" value is written to the data block. In this fashion, the snapshot facility 53 gives the network clients read-write access to a production version of the file system by accessing the "new" values of the file system data blocks that have changed since the snapshot creation time. For creation of the full backup copy 55 of the file system, the snapshot facility 53 gives the backup facility 54 read-only access to a snapshot copy of the file system by accessing the "old" values of file system data blocks that have changed since the snapshot creation time. There are various ways that a snapshot facility may keep a record of the changed file system data blocks, and save the "old" values of the changed file system data blocks. A specific example is described in Bixby et al. U.S. Pat. No. 7,555,504 issued Jun. 30, 2009, entitled Maintenance of a File Version Set Including Read-Only and Read-Write Snapshot Copies of a Production File, incorporated herein by reference.

At periodic times or when invoked by a client, the backup facility 54 creates an incremental backup copy 56, 57 of the file system. Each incremental backup copy 56, 57 includes copies of the files that have changed since the time of the last backup. For example, a first incremental backup 56 includes copies of all of the files of the file system that have changed since the creation time 61 of the full backup copy 55. A second incremental backup 57 includes copies of all of the files of the file system that have changed since the start time of the first incremental backup 56.

The start time for an incremental backup is the time when the backup facility 54 begins a depth-first scan of the file system tree in order to find files that have changed since the time of the last backup. The start time of each incremental backup is stored in association with the incremental backup. Thus, the first incremental backup 56 has a start time 62, and the second incremental backup has a start time 63.

During a scan, the backup facility 54 finds a changed file by comparing the values of the creation time (ctime) and modification time (mtime) attributes of the file to the time of the last backup. If the creation time or the modification time for a file is after the time of the last backup, then the file is queued for copying from the file system (30 in FIG. 1) in the on-line data storage (28 in FIG. 1) to the backup storage; i.e., the tape cartridge 58. The scan resumes after the file is queued for copying.

If the file server receives a request from a client for read-write access to the file system during the scan, then the file server interrupts the scan and services the read-write request. Although giving priority access to clients during the scan is most desirable, it raises the possibility that the same version of a file will be backed up twice, first by the present scan and second by the next scan. This possibility arises when a file is changed by a client during the present scan but prior to the file being visited by the present scan and therefore the file is backup up during the present scan. This file may be backed up again during the next scan for the next incremental backup even though the file is not changed again before the next incremental backup.

The present invention recognizes that there are disadvantages as well as advantages associated with the conventional method of incremental backup of files in a file system. The disadvantages have become more pronounced as file systems have grown in size and users have become less diligent in removing old and infrequently accessed files from on-line storage due to the ever decreasing cost of storage. Incremental backups, however, are still performed at frequent intervals. Consequently, a greater amount of time is being spent scanning the file system for files that have changed since the last backup. This increase in scanning time interferes with concurrent client access to the file system directories and may also lead to increased processing load or inefficiency in the backup process due to the handling of files that are changed during the scanning process. In view of these problems, it is desired to accelerate the incremental backup process so that an incremental backup does not require a full scan of the file system tree, yet changed files are still backed up in the order that they appear in a depth-first scan of the file system in order to satisfy user expectations.

A most convenient way of accelerating the incremental backup process is to provide each directory in the file system with a new tree modification attribute for indicating whether or not the tree of the directory was modified since the last backup. The directory tree was modified since the last backup if the directory itself or any of its descendants were modified. During a depth-first scan of the file system tree for an incremental backup, if the tree modification attribute indicates that the tree of a directory was not modified since the last backup, then the scanning process may skip over this entire directory tree. Therefore, for the case of a large file system tree in which only a small percentage of the files have changed since the time of the last backup, the depth-first scan of the file system tree will skip over a large majority of the file system tree. Consequently, the scan time will be reduced to a small fraction of the scan time for a full scan of the file system tree.

In a preferred implementation, the tree modification attribute is a tree modification time indicating whether or not the directory tree was modified since the last backup by a comparison of the tree modification time to the time of the last backup. If the tree modification time is more recent than the time of the last backup, then the directory tree was modified since the last backup. Otherwise, the directory tree was not modified since the last backup.

In the least complex implementation, the tree modification time attribute of a directory is updated in response to a change in the creation time or modification time of any file in the directory tree so that the tree modification time is set to the most recent of the creation time or the modification time of this changed file. In this case, the tree modification time indicates the most recent of the creation time or modification time of any file in the directory tree.

Figure 3:
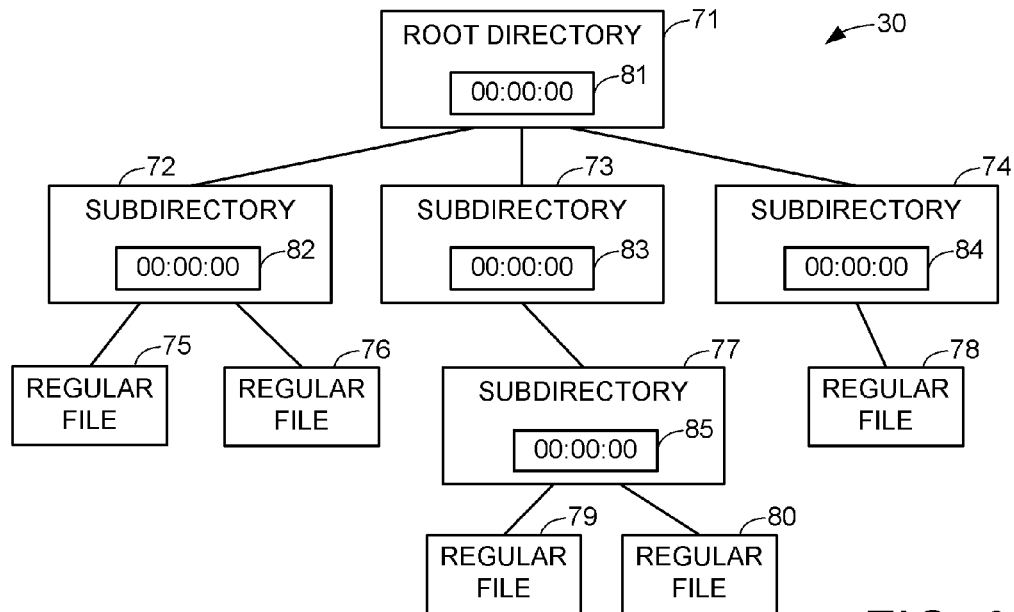
FIG. 3 is a block diagram showing a root directory, subdirectories, and regular files in the tree of the file system introduced in FIG. 1.

A specific example of the use of tree modification time attributes is shown in FIG. 3. In this example, the tree of the file system 30 includes a root directory 71 having a tree modification time attribute 81. The root directory 71 has entries for three subdirectories 72, 73, 74, having respective tree modification time attributes 82, 83, 84. The subdirectory 72 has entries for two regular files 75, 76. The subdirectory 73 has an entry for a subdirectory 77. The subdirectory 77 has a tree modification time attribute 86 and entries for two regular files 79 and 80. The subdirectory 74 has a tree modification time attribute 84 and an entry for a regular file 78.

In FIG. 3, if a conventional depth-first scan of the file system would visit and back-up all the files in the file system, then the files would be backed up in the following order: regular file 75, regular file 76, subdirectory 72, regular file 79, regular file 80, subdirectory 77, subdirectory directory 73, regular file 78, subdirectory 74, and finally root directory 71.

In FIG. 3, all of the tree modification time attributes have an initial value of zero. For example, the initial value of zero would be the initial value of the tree modification time attributes for all of the directories at the snapshot time for creating the full backup copy (55 in FIG. 2) of the file system. In practice, the time of the last backup is specified by a date-time stamp having a precision of at least a millisecond, so that this date-time stamp would have a value greater than zero. So initially the time of the last backup exceeds the value of the tree modification time of zero. A scan of the file system tree would immediately find that the tree modification time of the root directory would be before the last backup time, so that the scan would immediately skip the entire tree.

Figure 4:
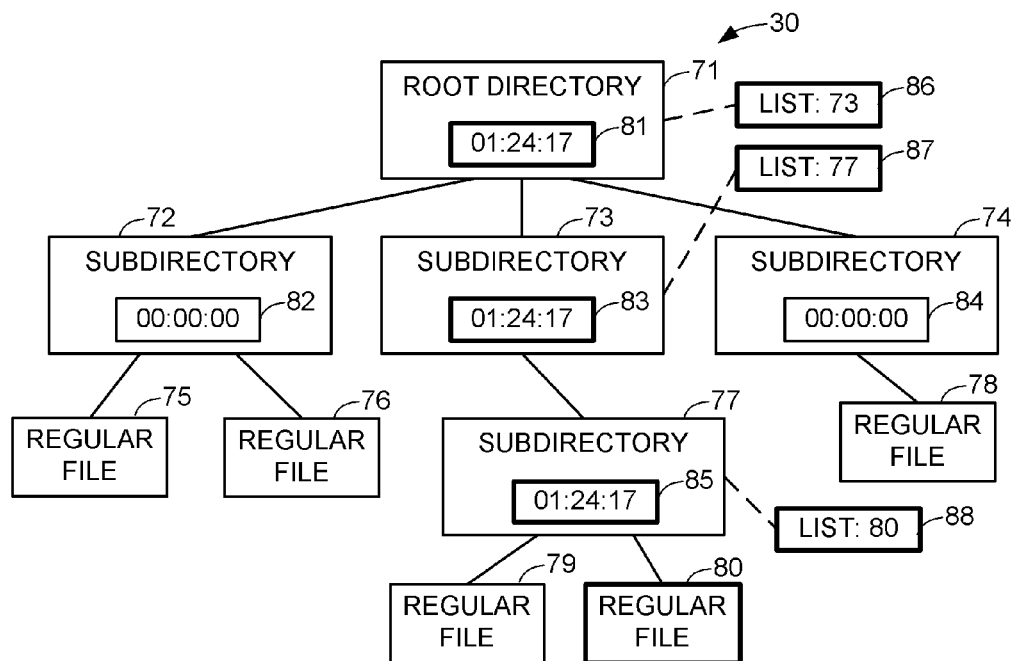
FIG. 4 is a block diagram showing how the modification of a regular file in the file system of FIG. 3 causes changes to a tree modification time attribute of ancestor directories in the file system and lists of changed branches in the file system tree.

As shown in FIG. 4, at a time of 01:24:17, the file system of FIG. 3 is changed by modification of the regular file 80. This modification time is propagated up the tree so that every ancestor directory of the regular file 80 has its tree modification time attribute set to the time of 01:24:17 when the regular file was modified. When the backup facility scans the file system tree 30 in a depth-first fashion to produce an incremental backup, the backup facility finds that the tree modification time 00:00:00 for the subdirectory 72 is before the time of the last backup, so that the scan skips over the subdirectory 72 and the regular files 75 and 76 having entries in the subdirectory 72. The backup facility also finds that the tree modification time 00:00:00 for the subdirectory 74 is before the time of the last backup, so that the scan skips over the subdirectory 74 and the regular file 78 having an entry in the subdirectory 74. The depth-first scan does not skip over the regular files 79, 80 and the subdirectories 77 and 73 and the root directory 71.

Further, in a preferred implementation, the backup facility is programmed to change the tree modification time attribute of a directory without causing a change in the creation time (ctime) or modification time (mtime) of the directory. In this case, the backup facility scans the tree of the file system of FIG. 4 and finds that only the regular file 80 has changed since the time of the last backup, which was the full backup of the file system, so that an incremental backup of the file system 30 as shown in FIG. 4 would include a copy of only the regular file 80.

Use of a tree modification time attribute for accelerating the search for changed files has the peculiar advantage that the tree modification time attribute can be updated in background in a delayed fashion and in a fashion asynchronous to the creation of the incremental backups without causing errors and with minimal degradation in the acceleration of the search. This is a consequence of the fact that delay in updating the tree modification time for a directory may only result in the undesired needless scanning of the directory and its descendants, and this undesired needless scanning is scanning that occurs in the conventional method of scanning for changed files during the incremental backup process.

It is desired to update the tree modification time in background so as not to interfere with other client read-write access and in particular read-write access that may occur in a burst following the write access that changed the file. Therefore, it is most desirable for the file system manger to acknowledge completion of the write access that changed the file, and then queue a request to update the tree modification time attribute of each ancestor directory of the changed file.

In practice, it is possible for the file system manager to identify quickly whether a file system access operation that changes a file after the last backup is the first such access operation that changes the file after the last backup. Moreover, the tree modification time attribute does not need to be updated (until after the next backup) for subsequent changes to the file after the first change to the file since the last backup. The tree modification time is still effective for skipping over the directory tree when no files in the directory tree have changed since the last backup of the file system regardless of whether the tree modification time is updated for the first change to each file in the directory tree after the last backup, or for every change to each file in the directory tree. In practice, processing time is saved by updating the tree modification time only for the first change to each file in the directory tree since the last backup.

The directories of the file system may be provided with additional new attributes for accelerating the search for changed files during the incremental backup process. In particular, for large or flat directories, it is desirable to maintain a list of the directory entries that actually need to be searched. A large directory has more entries than average for a directory in the file system, and a flat directory is a directory that does not include subdirectories. A directory entry actually needs to be searched because the file of the entry has changed since the time of the last backup, or because the file of the entry is a directory having a descendant file that needs to be searched. In other words, a directory entry needs to be searched because it represents a branch that has changed in the directory tree. Although such a list is more complex to manage than the tree modification time attribute, the software for updating the tree modification time attribute provides a base from which to add further software for maintaining the list.

For example, in FIG. 4, lists 88, 87, and 86 are updated when walking up the file system tree to update the tree modification time attributes 85, 83, and 81 with the change time of the regular file 80. The list 88 for the subdirectory 77 is updated to include the identifier 80 of the regular file 80. The list 87 for the subdirectory 73 is updated to include the identifier 77 for the subdirectory 77. The list 86 is updated to include the identifier 73 for subdirectory 73. In practice, respective inode numbers are used to identify the files included in each list.

The list of the directory entries that actually need to be searched significantly changes from one incremental backup to the next so that it is expedient to create an entirely new list for each incremental backup. In practice, it is desirable to begin building the new list for the next incremental backup in response to high-priority client write operations upon the file system before the background process of copying the changed files to the backup storage is finished using the old list for finding the changed files. In this case, at least two lists are associated with each large or flat directory. At any given time, one list is the new list that is being built, and the other list is the old list that is being deconstructed as changed files are copied to backup storage. At the start time of each incremental backup, the new and filled list becomes the old list, and the old and empty list is recycled and becomes the new list for the next incremental backup. A specific example of such an incremental backup system built upon the software for updating the tree modification time attribute and maintaining the two lists will now be described with respect to FIGS. 5-17.

Figure 5:
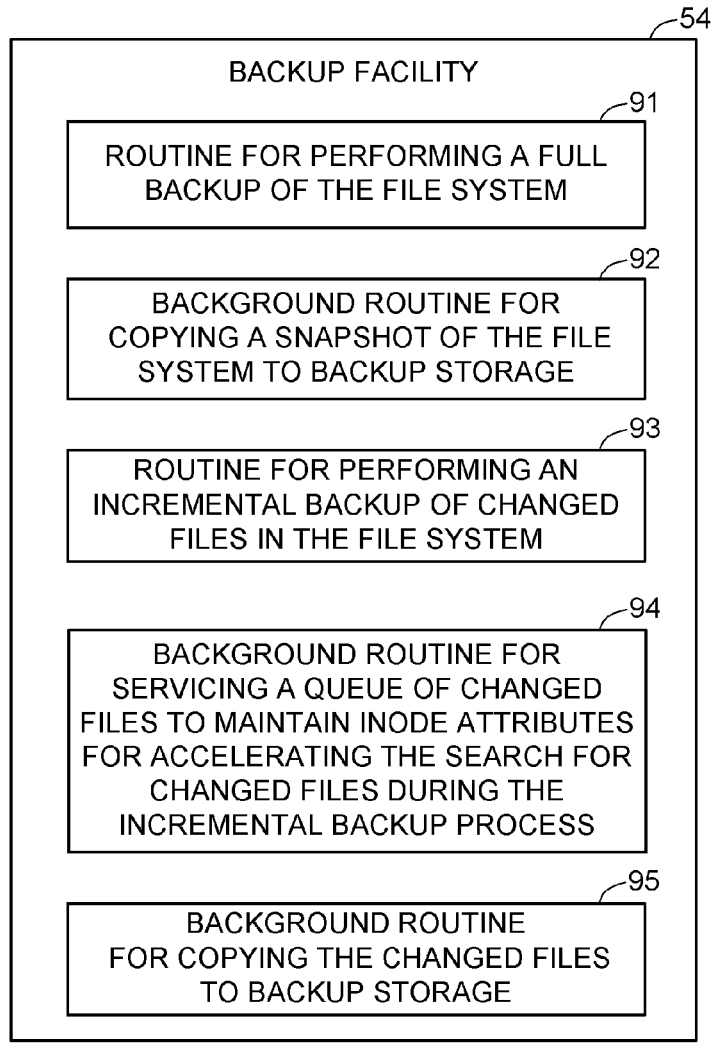
FIG. 5 is a block diagram showing computer program routines in a backup facility introduced in FIG. 1.

FIG. 5 shows computer program routines in the backup facility 54. The routines include a routine 91 for preforming a full backup of the file system, a background routine 92 for copying a snapshot of the file system to backup storage, a routine 93 for performing an incremental backup of changed files in the file system, a background routine 94 for servicing a queue of changed files to maintain inode attributes for accelerating the search for changed files during the incremental backup process, and a background routine 95 for copying the changed files to backup storage.

Figure 6:
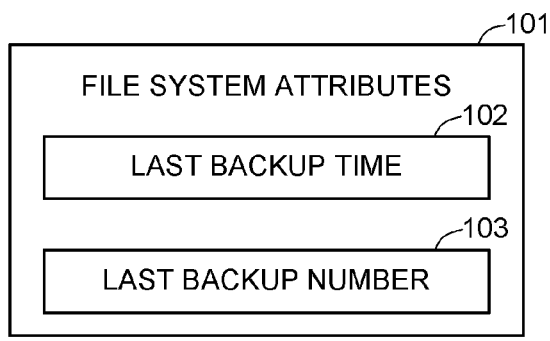
FIG. 6 is a block diagram showing a "last backup time" attribute and a "last backup number" attribute of the file system.

FIG. 6 shows that the file system attributes 101 include a "last backup time" attribute 102 and a "last backup number" attribute 103 of the file system. When the snapshot facility takes a snapshot copy of the file system in order to produce the full backup copy, the last backup time is set to the present time so that it is the "create time" for the full backup, and the last backup number is zero at this time designating the backup number of the full backup copy. When the scan of the file system for each incremental backup is started, the last backup time is again set to the present time so that it is the "start time" of the last incremental backup, and the "last backup number" is incremented by one.

Figure 7:
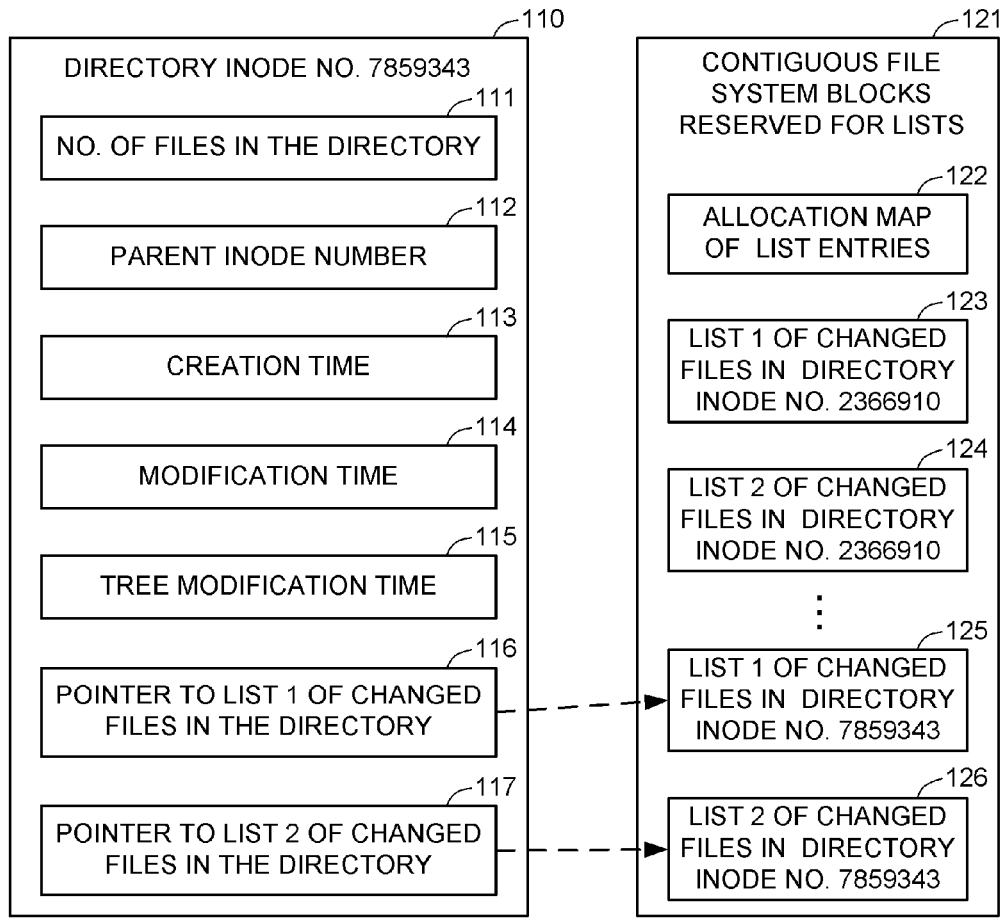
FIG. 7 is a block diagram showing various directory attributes used by the backup facility introduced in FIG. 1.

FIG. 7 shows various directory attributes used by the backup facility. These attributes are found in the directory inode 110. These attributes include the number of files in the directory 111, the parent inode number 112, the creation time (ctime) 113 for the inode, the modification time (mtime) 114 for the file of the inode, the tree modification time 115 for the tree of the file of the inode, a first pointer 116 to a first list 125 of changed files in the directory of the inode, and a second pointer 117 to a second list 126 of changed files in the directory of the inode.

The lists 125, 126 of changed files include not only changed files but also files that need to be visited because they are ancestor directories of changed files. The lists of changed files are built in the storage 121 of a set of contiguous file system blocks reserved for lists. This storage 121 includes an allocation map 122 for list entries from the storage 122. The list entries are dynamically allocated to the lists, such as the lists 123, 124, 125, and 126. The first pointer 116 points to the first list 125 of changed files in the directory of the inode 110. The second pointer 117 points to the second list 126 of changed files in the directory of the inode 110.

Figure 8:
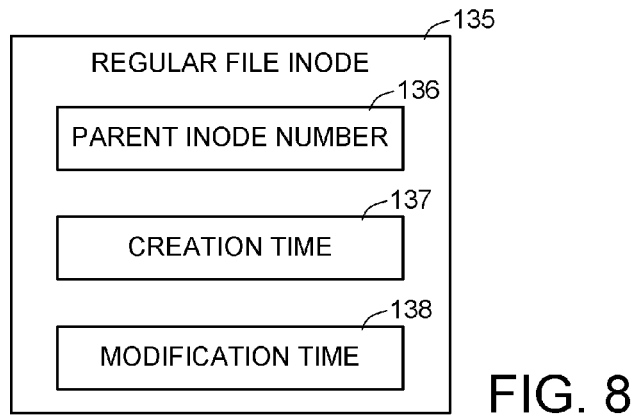
FIG. 8 is a block diagram showing regular file attributes used by the backup facility introduced in FIG. 1.

FIG. 8 shows regular file attributes used by the backup facility. These regular file attributes are found in the inode 135 of the regular file and include a parent inode number 136, a creation time (ctime) 137, and a modification time (mtime) 138.

Figure 9:
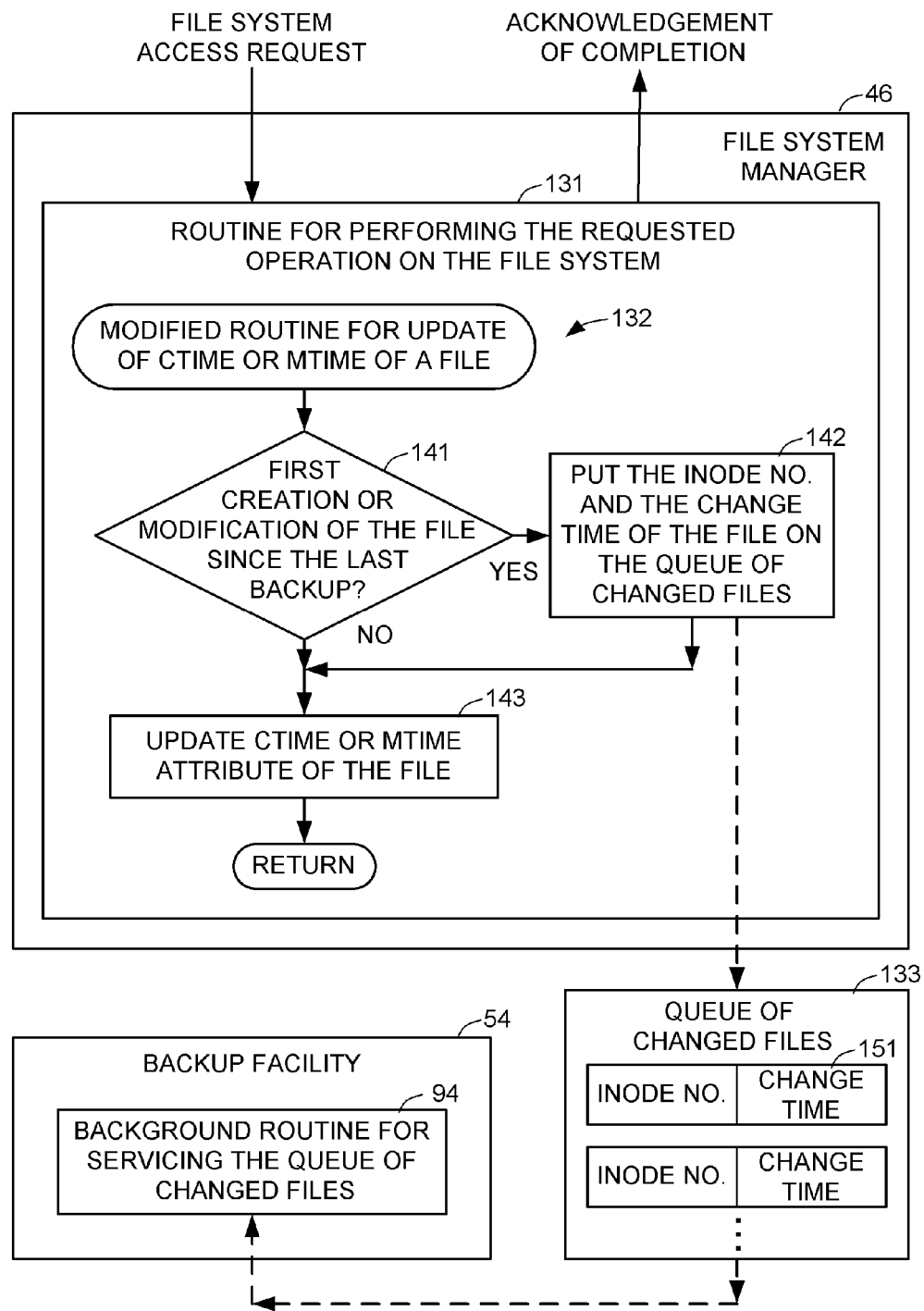
FIG. 9 is a block diagram showing the use of a queue of changed files as an interface between the backup facility and a file system manager introduced in FIG. 1.

FIG. 9 shows the use of a queue 133 of changed files as an interface between the backup facility 54 and the file system manager 46. The queue 133 is serviced by the background routine 94 in the backup facility 54. The file system manager 46 includes various routine for performing requested operations upon the file system. Each such routine 131 that change a file invokes a routine 132 for updating the creation time (ctime) or modification time (mtime) of the file. This routine 132 is modified to determine in step 141 whether or not the changed file was created or changed for the first time since the last backup, and if so, to branch to step 142 to put the inode number and the change time of the file into an entry 151 on the queue of changed files 133. In step 141, if the changed file was not created or changed for the first time since the last backup, then execution continues to step 143 to update the creation time (ctime) or modification time (mtime) attribute of the file. Execution also continues from step 142 to step 143. Execution returns from step 143.

Figure 10:
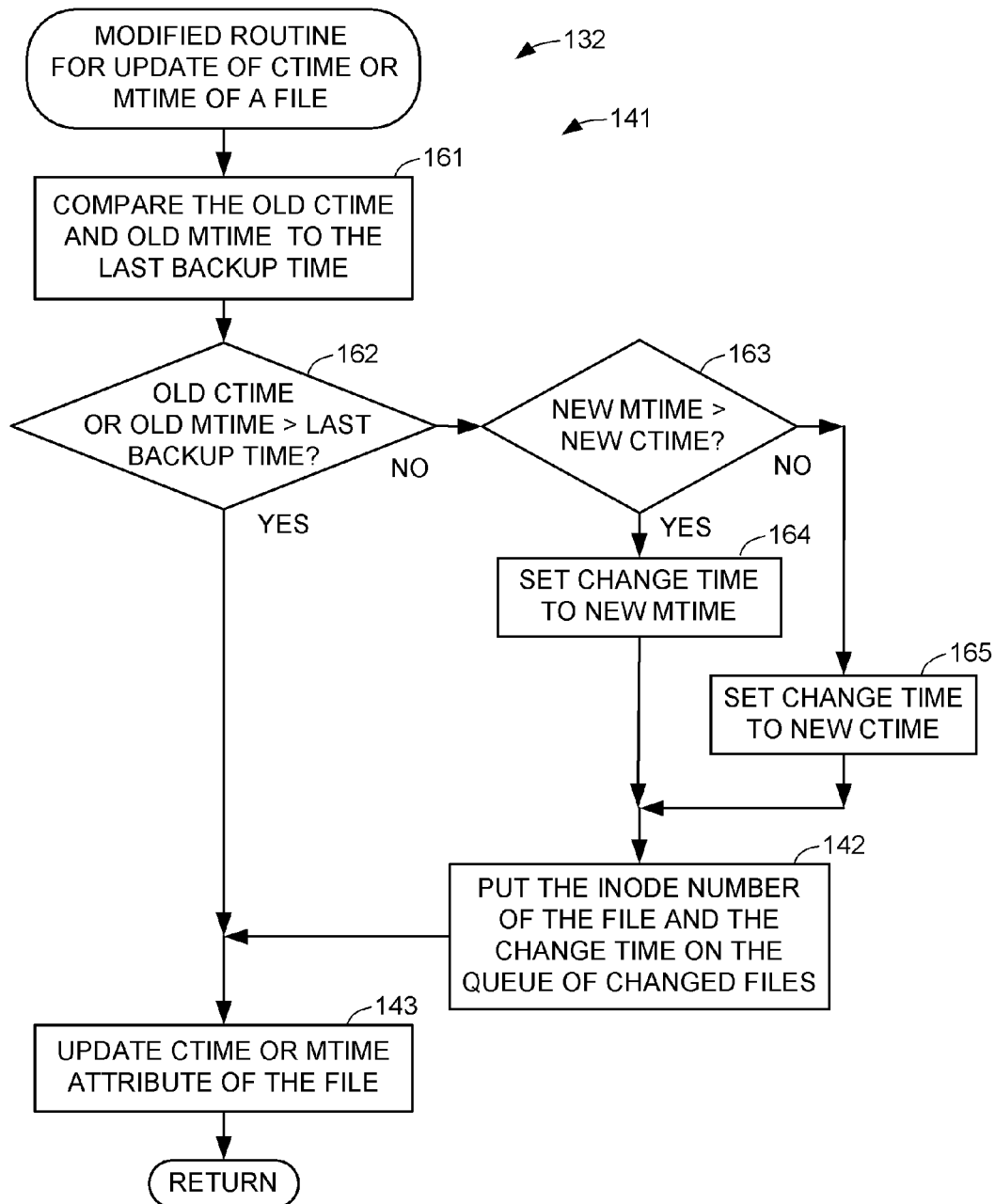
FIG. 10 is a flowchart showing how a routine in the file system manager for updating the creation time attribute (ctime) and the modification time attribute (mtime) detects when a file is first changed after the time of the last backup so that the file is placed on the queue of changed files.

FIG. 10 shows further details of how the routine 132 for updating the creation time attribute (ctime) and the modification time attribute (mtime) detects when a file is first changed after the time of the last backup so that the file is placed on the queue of changed files. Step 141 of FIG. 9 includes a step 161 for comparing the old creation time (ctime) and the old modification time (mtime) of the changed file to the last backup time. In step 162, if the old ctime or the old mtime is greater than the last backup time, then execution continues to step 143 because this is not the first time that the changed file has been changed since the last backup time. Otherwise, execution branches from step 162 to step 163. Steps 163, 164, and 165 set the change time to the most recent of the new mtime or the new ctime. In step 163, if the new mtime is greater than the new ctime, then execution continues to step 164 to set the change time to the new mtime. Otherwise execution branches from step 163 to step 165 to set the change time to the new ctime. Execution continues from step 164 or step 165 to step 142, to put the inode number of the file and the change time on the queue of changed files. Execution continues from step 142 to step 143. Execution returns from step 143.

Figure 11:
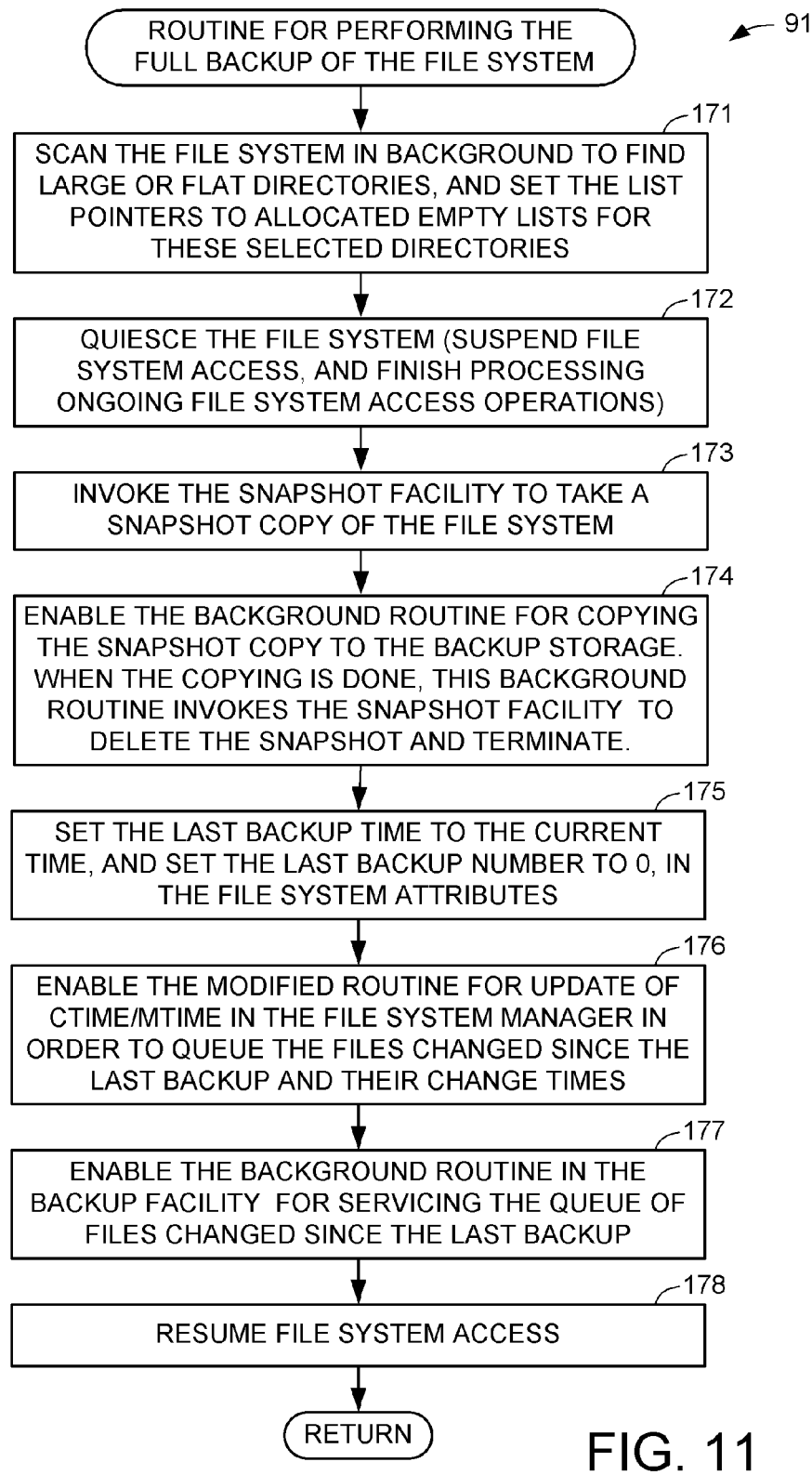
FIG. 11 is a flowchart of a routine for performing the initial full backup of the file system.

FIG. 11 shows the routine 91 for performing the initial full backup of the file system. In a first step 171, the file system is scanned in background to find large or flat directories, and to set the list pointers (116, 117 in FIG. 7) to allocated empty lists for these large or flat directories. Next, in step 172, the file system is put in a quiescent state by suspending file system access, and finishing the processing of any ongoing file system access operations. Then, in step 173, the snapshot facility is invoked to take a snapshot copy of the file system. Then, in step 174, the background routine is enabled for copying the snapshot copy of the file system to the backup storage, in order to create the full backup copy (55 in FIG. 2) of the file system. When this background copying is done, the background routine invokes the snapshot facility to delete the snapshot copy and terminate the snapshot copy process. Then the background copying routine terminates itself. In the usual case, the background copying enabled in step 174 is ongoing when the routine 91 in FIG. 11 is finished, and continues well after the routine 91 in FIG. 11 is finished.

Execution continues from step 174 to step 175. In step 175, the last backup time (102 in FIG. 6) is set to the current time, and the last backup number (103 in FIG. 6) is set to zero, in the file system attributes (101 in FIG. 6). Next, in step 176, the modified routine (132 in FIGS. 9 and 10) for update of the creation time (ctime) and modification time (mtime) file attributes is enabled in the file system manager in order to queue the files changed since the last backup, and the change times associated with these changed files. Then, in step 177, the background routine (94 in FIG. 5) in the backup facility is enabled for servicing the queue of files changed since the last backup. Finally, in step 178, file system access is resumed, and execution returns.

Figure 12:
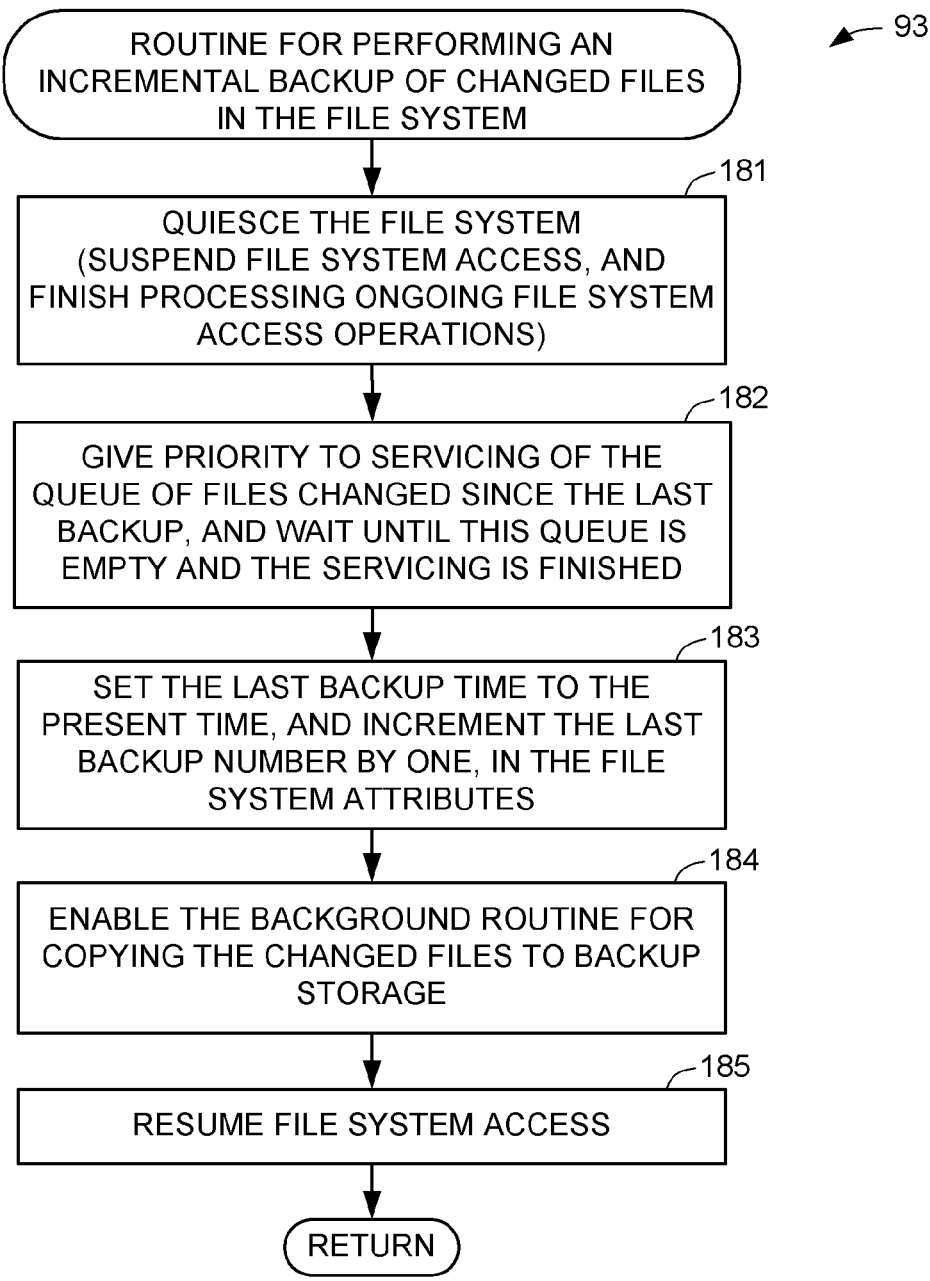
FIG. 12 is a flowchart of a routine for performing an incremental backup of changed files in the file system.

FIG. 12 shows the routine 93 for performing an incremental backup of changed files in the file system. In a first step 181, the file system is put in a quiescent state by suspending file system access, and finishing the processing of any ongoing file system access operations. Next, in step 182, priority is given to the servicing of the queue (133 in FIG. 9) of files changed since the last backup, and the routine 93 waits until this queue is empty and servicing of this queue is finished. In other words, the priority of the background routine 94 for servicing this queue is temporarily elevated from background to foreground and given priority over the routine 93. Therefore, when step 182 is completed and execution continues to the next step 183, the background routine 94 has synchronized the quiescent state of the file system with the particular one of the lists (116, 117) presently being used to record the changed files for each large or flat directory in the file system, so that this list is now a complete list of the changed files in the directory, or ancestor directories of one or more changed files in the file system.

In step 183, the last backup time (102 in FIG. 6) is set to the present time, and the last backup number (103 in FIG. 6) is incremented by one, in the file system attributes. Next, in step 184, the background routine (95 in FIG. 5) is enabled for copying the changed files to backup storage. Then, in step 185, file system access is resumed, and execution returns.

Figure 13:
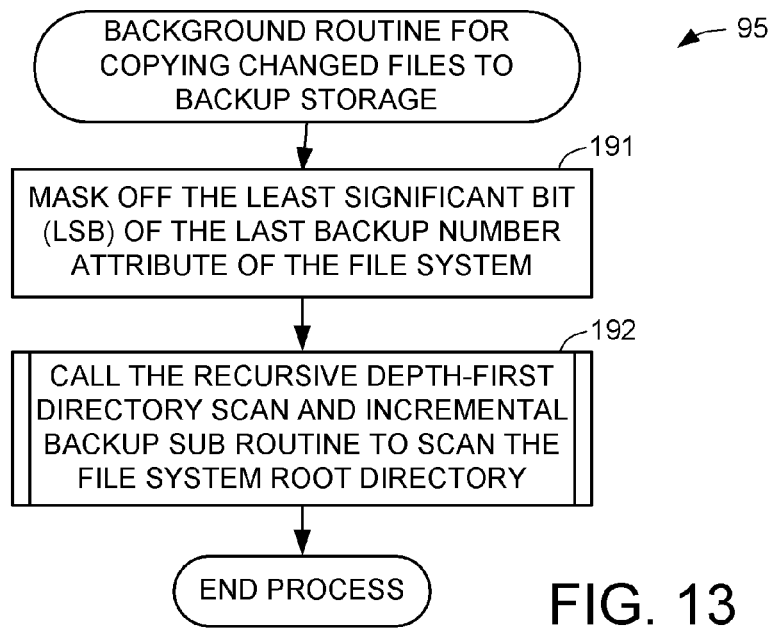
FIG. 13 is a flowchart of a background routine enabled by the routine of FIG. 12 for copying the changed files to backup storage.

FIG. 13 shows the background routine 95 for copying the changed files to backup storage. In a first step 191, the least significant bit (LSB) of the last backup number (103 in FIG. 6) attribute of the file system is masked off (This least significant bit is used as a switch to select either the first list or the second list of changed files in each large or flat directory for the process of adding changed files to the selected list for accelerating the next incremental backup, and later for the process of removing the changed files from the selected list when this incremental backup is created by copying the changed files to backup storage.) Next, in step 192, a recursive depth-first directory scan and incremental backup subroutine (in FIG. 14) is called to scan the file system root directory. After step 192, execution of the background routine 95 terminates.

Figure 14:
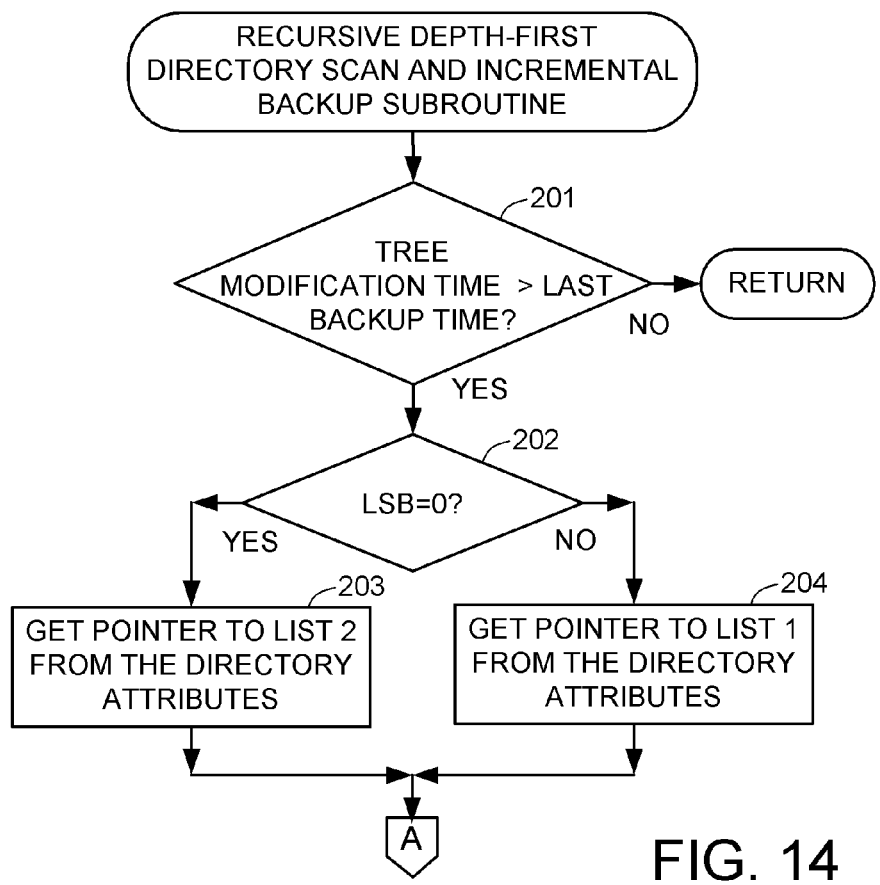
FIGS. 14 and 15 together comprise a flowchart of a recursive depth-first directory scan and incremental backup routine called by the routine of FIG. 13.
Figure 15:
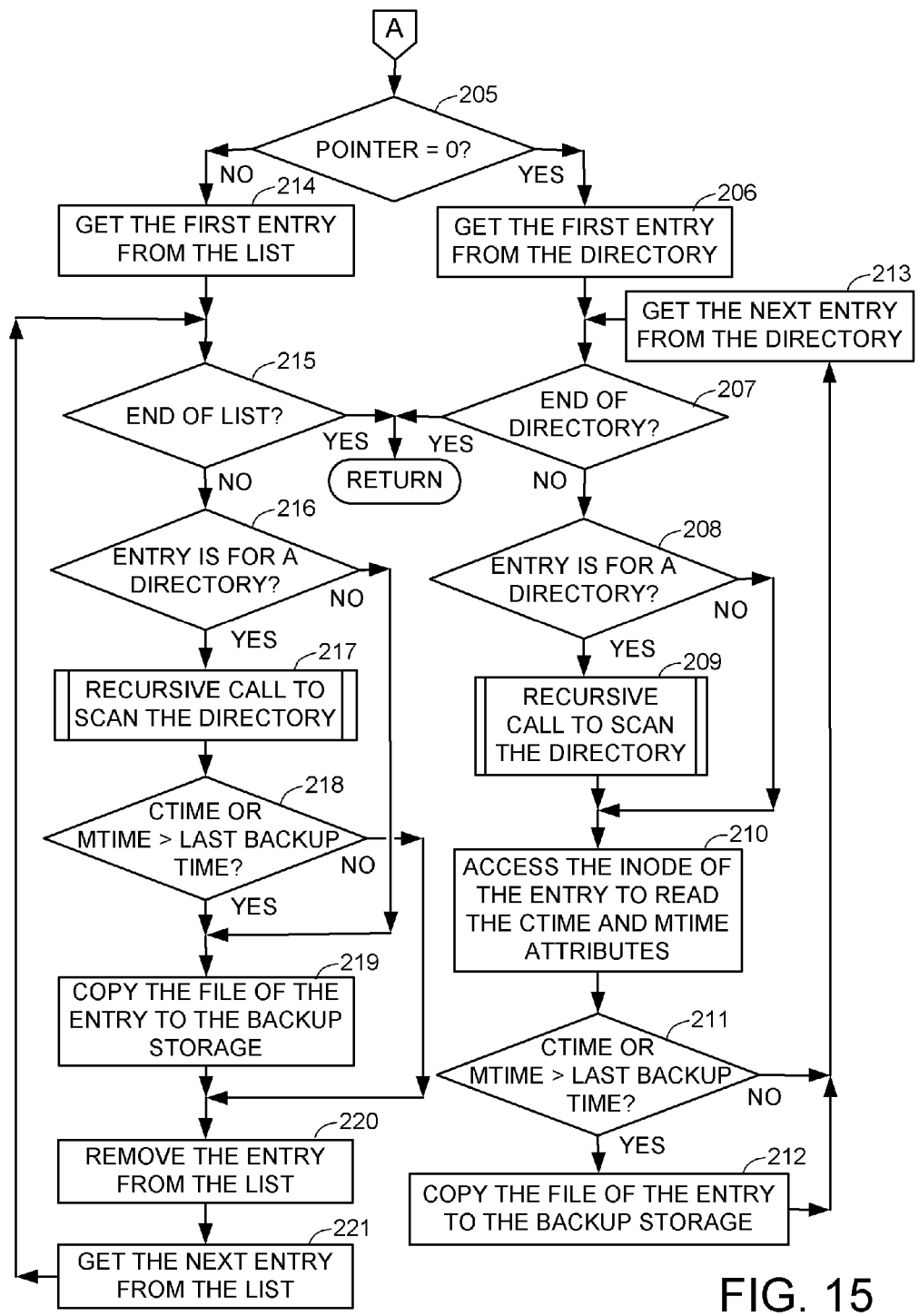

FIGS. 14 and 15 together show the recursive depth-first directory scan and incremental backup subroutine (called in step 192 of FIG. 13). The computer program instruction calling this subroutine specifies the inode number of a directory to be scanned. In a first step 201, if the tree modification time in the specified directory inode is not greater than last backup time (102 in FIG. 6) of the file system, then execution returns. Otherwise, execution continues from step 201 to 202. In step 202, if the least significant bit (LSB, from step 191 in FIG. 13) is a logic zero, then execution continues to step 203 to get the pointer (117 in FIG. 7) to the second list from the attributes in the specified directory inode. Otherwise, in step 202, if the least significant bit is a logic 1, then execution branches to step 204 to get the pointer (116 in FIG. 7) to the first list from the attributes in the specified directory inode. Execution continues from step 203 or step 204 to step 205 in FIG. 15.

In step 205 of FIG. 15, if the pointer is equal to zero, then a list has not been allocated to the directory, so execution branches to step 206 to begin a conventional scan of all entries in the directory, to look for entries of files having a creation time (ctime) or a modification time (mtime) greater than the last backup time (in step 211), and to copy such files to backup storage (in step 212). In step 206, the first entry of the directory is fetched. In the next step 207, if the end of the directory is reached (because the directory is empty), then execution returns. Otherwise, execution continues from step 207 to step 208. In step 208, if the entry is for a directory, then execution continues to step 209 to perform a recursive call to scan this directory. For example, in step 209, the subroutine of FIGS. 14-15 calls itself by executing a subroutine call instruction that specifies the inode number of the directory of the entry fetched in step 206. Therefore the scan walks down to the next level of the file system tree. Upon return from this recursive call, execution continues to step 210. Execution also continues to step 210 from step 208 if the entry is not an entry for a directory. For example, execution branches from step 208 to step 210 if the entry is an entry for a regular file.

In step 210, the inode of the inode number specified in the entry is accessed to read the creation time (ctime) and modification time (mtime) attributes from the entry. Then, in step 211, if the creation time or the modification time is greater than the last backup time, then execution continues to step 212 to copy the file of the entry to the backup storage because in this case the file was changed since the last backup time. After step 212, execution continues to step 213. Execution also branches from step 211 to step 213 if neither the creation time (ctime) nor the modification time (mtime) of the file of the entry is greater than the last backup time. In step 213, the next entry is fetched from the directory, and then execution loops back to step 207. Once all of the entries in the directory have been scanned, the end of the directory is reached in step 207 and execution returns.

Depending on the construction of the file system, the copying in step 212 may cause identical versions of the same file to be backed up more than once in each incremental backup. For example, if the construction of the file system permits more than one hard link to a file, then the copying in step 212 may cause an identical version of the same file for each hard link to the file. If applications create multiple hard links to the same file so that each incremental backup includes an undesirable percentage of duplicate files, then this problem can be avoided by preforming additional processing in step 212. For example, step 212 could maintain a separate database of files that have already been copied in step 212 to the current incremental backup, and before copying each file to the current incremental backup, step 212 would access this database to determine whether each file has already been backed up, and if so, then step 212 would terminate to avoid creating a duplicate copy in the current backup.

In step 205, if the pointer is not zero, then execution branches to step 214 to get the first entry from the pointed-to list. In step 215, if the end of the list has been reached, then execution returns. Otherwise, execution continues from step 215 to step 216. In step 216, if the entry is for a directory, then execution continues to step 217, In step 217, the subroutine calls itself to scan the directory of the entry. Therefore the scan walks down to the next level of the directory tree. Upon return, in step 218, if the creation time or the modification time for the directory of the entry is greater than the time of the last backup, then execution continues to step 219 to copy the directory of the entry to the backup storage. Execution also branches from step 216 to step 219 to copy the file of the entry to the backup storage if the entry is for a file other than a directory. Once the file of the entry has been copied to the backup storage, execution continues from step 219 to step 220. Execution also continues from step 218 to step 220 if neither the creation time (ctime) nor the modification time (mtime) is greater than the last backup time. In this case, the directory of the entry was included on the pointed-to list because the directory is an ancestor of a file that was changed since the time of the last backup. In step 220, the entry is removed from the list. Then, in step 221, the next entry is fetched from the pointed-to list. Execution loops from step 221 to step 215. In this fashion, the entries of the pointed-to list are scanned until the end of the list is reached in step 215, and execution returns.

Figure 16:
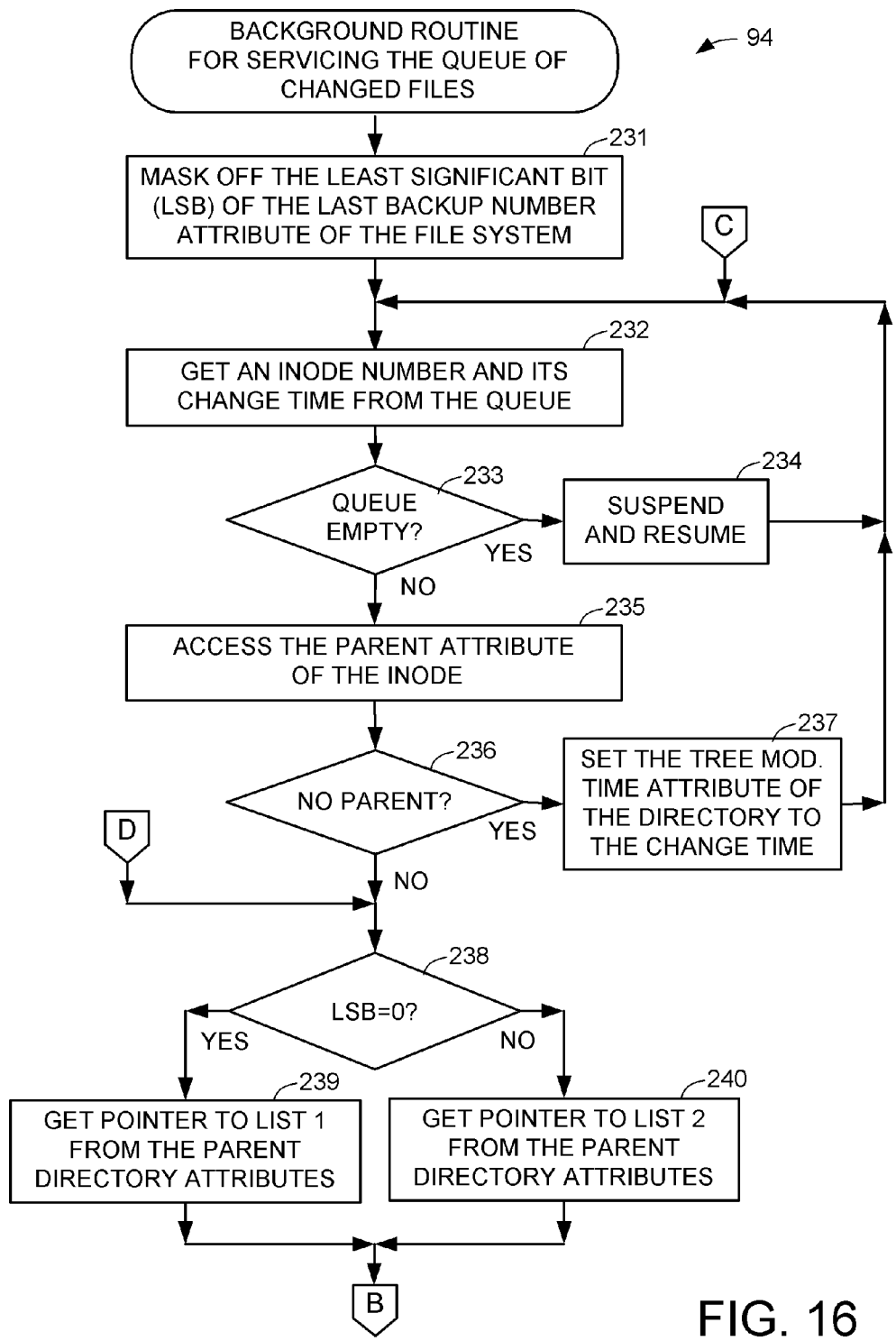
FIGS. 16 and 17 together comprise a flowchart of a background routine for servicing the queue of changed files.
Figure 17:
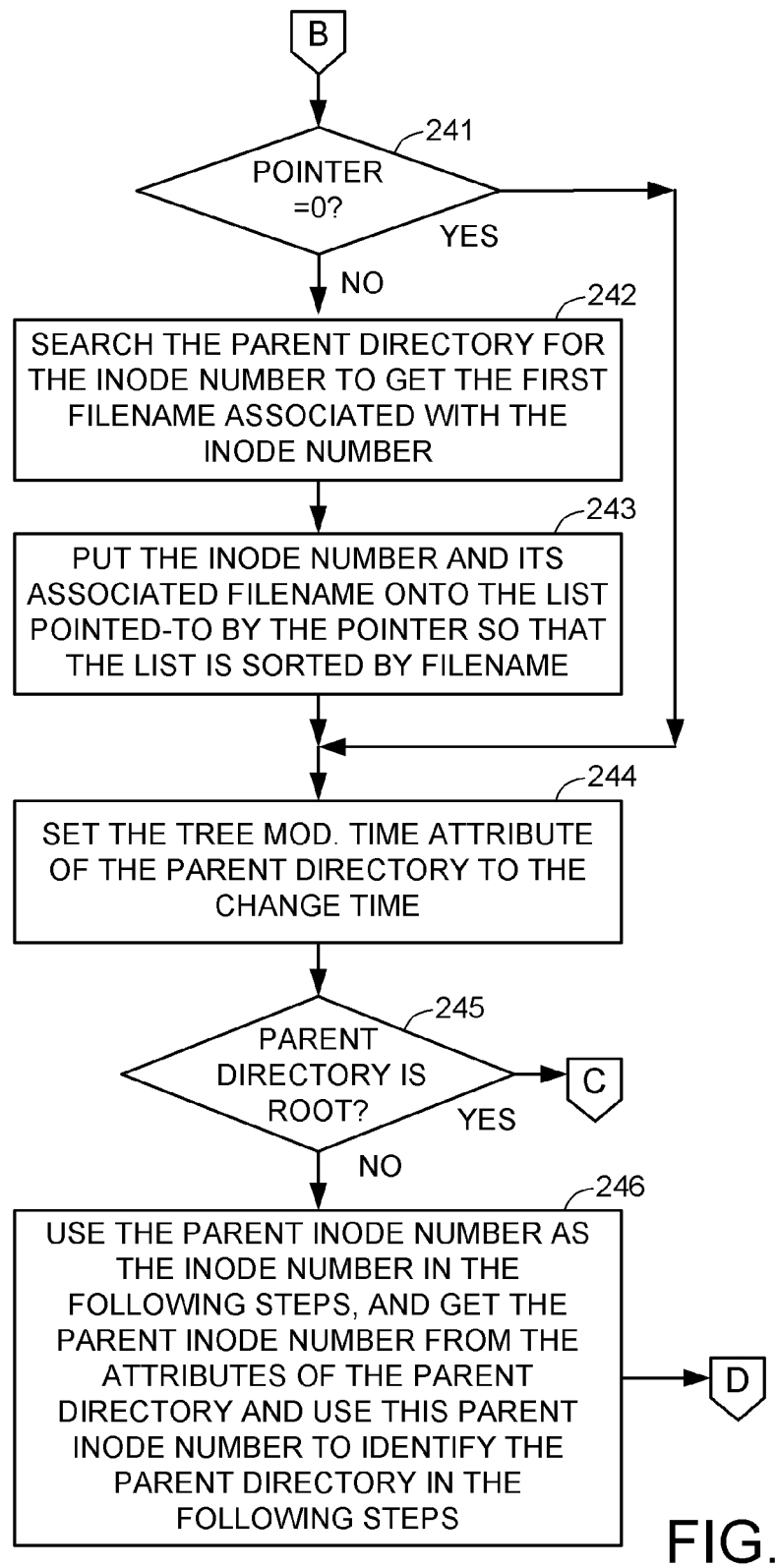

FIGS. 16 and 17 together show the background routine 94 for servicing the queue of changed files (133 in FIG. 9). In step 231, the least significant bit (LSB) of the last backup number attribute (103 in FIG. 6) of the file system is masked off to provide a switch for switching between the first and second list pointer attributes (116, 117 in FIG. 7). Next, in step 232, an inode number and its respective change time are fetched from the queue of changed files. In step 233, if the queue is empty, then execution branches to step 234 to suspend the background routine 94 for a time, and then execution resumes and loops back to step 232.

In step 233, if the queue is not empty, then execution continues to step 234 to access the parent attribute of the inode from the queue. In step 236, if this parent attribute indicates that there is no parent (for example, the inode from the queue is the inode of the root directory), then execution branches to step 237. In step 237 the tree modification time attribute of the directory is set to the change time from the queue, and execution lops back to step 232.

In step 238, if the least significant bit (LSB, from step 231) is a logic zero, then execution continues to step 239 to get the pointer (116 in FIG. 7) to the first list from the parent directory attributes. Otherwise, in step 238, if the least significant bit is a logic 1, then execution branches to step 240 to get the pointer (117 in FIG. 7) to the second list from the parent directory attributes. Execution continues from step 239 or step 240 to step 241 in FIG. 17.

In step 241 in FIG. 17, if the selected pointer is not equal to zero, then execution continues to step 242. In step 242, the parent directory is searched for the inode number to get the first filename associated with the inode number. Then, in step 243, the inode number and its associated filename are put on the list pointed-to by the selected pointer so that the list is sorted by filename. In this example, the parent directory entries are also sorted by filename, so that the list is maintained as a sparse shadow of the entries in the directory, generally in the same order as the entries in the directory. If there is no desire to maintain the list in the same order as the entries in the directory, then step 242 is omitted, no filename is put on the list, and the list is not sorted by filename. After step 243, execution continues to step 244. Execution also branches from step 241 to step 244 if the selected pointer is equal to zero.

In step 244, the tree modification time attribute of the parent directory is set to the change time. Next, in step 245, if the parent directory is the root directory, then execution loops back to step 232 of FIG. 16. Otherwise, execution continues from step 245 to step 246.

In step 246, in order to begin a walk up the file system tree, the parent inode number is used as the inode number in the following steps. Also in step 246, a new parent inode number is obtained from the parent attribute of the parent directory, and this new parent inode number is used to identify the parent directory in the following steps. Execution then loops from step 246 back to step 238. Therefore the following steps walk up the file system tree to set the tree modification time attribute of each ancestor directory to the change time, and to add each ancestor directory to any selected list of its parent directory, except the root directory of the file system is not added to any selected list because the root directory does not have a parent directory in the file system. The process of walking up the file system tree and setting the tree modification time attributes of each ancestor directory and adding each ancestor directory to any selected list of its parent directory continues until the root directory of the file system is reached, the tree modification time attribute is set with the change time, any selected list of the parent directory is updated, and execution branches from step 245 to step 232.

Although a preferred embodiment has been shown in the drawings, it should be apparent that this preferred embodiment can be modified in various ways while still obtaining the benefits of the tree modification time attributes and the lists of files that have changed since the time of the last backup. In particular, tree modification time attributes and pointers to the lists of changed files have been shown as directory attributes stored in the directory inode. If there is insufficient free space in each directory inode to store the tree modification time attribute and the first and second pointers to the first and second lists of changed files, then the tree modification attribute and the first and second pointers to the first and second lists of changed files could be stored as extended file attributes. For example, each the directory inode could have a single pointer pointing to a respective table of extended file attributes. The tables of extended file attributes could be stored in a region of contiguous file system blocks reserved for the tables.

It would also be possible to store the tree modification time attribute and the first and second pointers for each directory as a respective record in a database entirely separate from the file system. In this case, the inode number would be a primary key for each record in the database. For example, the records in such a database are indexed by a conventional hash key index. A lookup operation for a given inode number is performed by hashing the inode number to get an index for a hash table of hash lists, and then using this index to index the hash table to locate a hash list, and then searching the hash list for a hash list entry having the given inode number. The hash list entry would also contain a pointer to the record in the database containing the tree modification time attribute and the first and second pointers for the directory having the given inode number.

In view of the above, there has been described a way of accelerating the process of creating incremental backups of changed files in a file system by a top-down search of the file system tree for changed files. The time for creating an incremental backup has been rapidly increasing with the total number of files in the file system, despite the fact that the rate of change, in terms of the number of files changed over the interval of time between incremental backups, has been increasing at a much slower rate. This problem is solved by providing directory attributes used during the file system scan for changed files so that the time for creating an incremental backup of a file system is proportional generally to the number of files that change between backups instead of the number of files in the file system. The additional directory attributes include a tree modification attribute indicating whether or not any file in a directory tree has changed since the last backup. If no file has changed in the directory tree since the last backup, then the entire directory tree is skipped during the file system scan for changed files. In a preferred implementation, this tree modification attribute is a tree modification time indicating the last time when a file in the directory tree was first modified since the last backup.

The additional directory attributes may further include at least one list of the files in a directory that represent branches of the directory tree that have at least one file that has changed since the last backup. Therefore this list includes any files in the directory that have changed since the last backup and any subdirectories in the directory that are ancestors of any files that have changed since the last backup. Therefore, when this list is present for a directory, the scan of the directory scans this list instead of scanning the directory entries. The scan of the directory is accelerated because the list is sparse in comparison to all of the directory entries. In a preferred embodiment, the list is used for directories that include more files that average for a directory in the file system, or for flat directories, which do not contain subdirectories, and the list is sorted by file name so that the list is maintained generally in the same order as the entries in the directory.

In a preferred embodiment, when a file is changed for the first time since the last backup, the inode number of the file is queued, and directory attributes associated with this changed file are updated from the queued inode number in a background process and later used to accelerate the search for changed files during the next incremental backup. A file system manager routine for updating the file's creation time and modification time very quickly determines when a file is first changed since the last backup.

In short, the rate at which these directory attributes are updated and the rate at which the search occurs when these directory attributes are present are primarily proportional to the number of files that have changed since the last backup. To a lesser degree, the rate at which these directory attributes are updated and the rate at which the search occurs when these directory attributes are present is proportional to the average depth of the file system tree rather than the number of files in the file system. Therefore the time for creating an incremental backup is generally proportional to the number of files that have changed since the last backup and generally independent of the number of files in the file system.

What is claimed is:

1. A method for use in rapid incremental backup of changed files in a file system, the method comprising:
   scanning a file system hierarchy of a file system in a top-down manner for determining a list of changed files for performing incremental backup of the file system;
   evaluating a directory tree modification attribute of each directory hierarchy of the file system hierarchy of the file system in the top-down manner, wherein the file system hierarchy includes a set of directory hierarchies, each directory hierarchy including a set of directories, each directory of the set of directories including a set of files, wherein the directory tree modification attribute of each directory hierarchy indicates whether at least one file in respective entire directory hierarchy has changed since a last backup, wherein the directory tree modification attribute is updated upon finding at least one changed file in the respective directory hierarchy since the last backup and without changing a modification time of a directory associated with the respective directory tree hierarchy;
   based on the evaluation, determining whether a directory hierarchy of the file system hierarchy has been changed since the last backup; and
   based on the determination, skip traversing files included in a directory hierarchy during the scanning of the file system hierarchy upon determining that the directory tree modification attribute associated with the directory hierarchy has not been updated since the last backup.

2. The method as claimed in claim 1, further comprising: determining that a file of a directory is being changed by a file system access operation for a first time since the last backup, and upon determining that the file is being changed by the file system access operation for the first time since the last backup, placing the file in a queue, and servicing the queue in background to update a directory tree modification attribute of the directory.

3. The method as claimed in claim 1, wherein the directory tree modification attribute of a directory hierarchy indicates a modification time of the directory hierarchy.

4. The method as claimed in claim 3, wherein evaluating the directory tree modification attribute of a directory hierarchy includes comparing the modification time of the directory hierarchy to a time of the last backup to determine whether or not any file in the directory hierarchy has been changed since the last backup.

5. The method as claimed in claim 3, wherein the method further includes a data processor executing a computer instructions to update the modification time of each of the directory hierarchies in response to changes in files in said each of the directory hierarchies so that the modification time of said each of the directory hierarchy indicates a most recent time that any file in said each of the directory hierarchy has been changed.

6. The method as claimed in claim 1, wherein a directory is associated with a directory inode, wherein the directory inode of the directory includes a tree modification time and a pointer to a list of changed files in the directory.

7. The method as claimed in claim 1, further comprising performing an operation in background for copying the list of changed files to a backup storage.

8. A method for use in rapid incremental backup of changed files in a file system, the method comprising:
   scanning a file system hierarchy of a file system in a top-down manner for determining a list of changed files for performing incremental backup of the file system;
   evaluating a directory tree modification attribute of each directory hierarchy of the file system hierarchy of the file system in the top-down manner, wherein the file system hierarchy includes a set of directory hierarchies, each directory hierarchy including a set of directories, each directory of the set of directories including a set of files, wherein the directory tree modification attribute of each directory hierarchy indicates whether at least one file in respective entire directory hierarchy has changed since a last backup, wherein the directory tree modification attribute is updated upon finding at least one changed file in the respective directory hierarchy since the last backup and without changing a modification time of a directory associated with the respective directory tree hierarchy;

based on the evaluation, determining that a file of a directory hierarchy is being changed by a file system access operation for a first time since the last backup, and upon determining that the file is being changed by the file system access operation for the first time since the last backup, placing the file in a queue, and servicing the queue in background to update a directory tree modification attribute of the directory hierarchy;

based on the determination, determining whether the directory hierarchy has been changed since the last backup; and based on the determination, determining whether to skip traversing the directory hierarchy during the scanning of the file system hierarchy for determining the list of changed files for performing incremental backup of the file system upon determining that the directory hierarchy has not been changed since the last backup.

9. A system for use in rapid incremental backup of changed files in a file system, the system comprising:

a processor;

first logic, for execution by the processor, to scanning a file system hierarchy of a file system in a top-down manner for determining a list of changed files for performing incremental backup of the file system;

second logic, for execution by the processor, to evaluate a directory tree modification attribute of each directory hierarchy of the file system hierarchy of the file system in the top-down manner, wherein the file system hierarchy includes a set of directory hierarchies, each directory hierarchy including a set of directories, each directory of the set of directories including a set of files, wherein the directory tree modification attribute of each directory hierarchy indicates whether at least one file in respective entire directory hierarchy has changed since a last backup, wherein the directory tree modification attribute is updated upon finding at least one changed file in the respective directory hierarchy since the last backup and without changing a modification time of a directory associated with the respective directory tree hierarchy;

third logic, for execution by the processor, to determine, based on the evaluation, whether a directory hierarchy of the file system hierarchy has been changed since the last backup; and fourth logic, for execution by the processor, to skip traversing, based on the determination, files included in a directory hierarchy during the scanning of the file system hierarchy upon determining that the directory tree modification attribute associated with the directory hierarchy has not been updated since the last backup.

10. The system of claim 9, further comprising:

fifth logic, for execution by the processor, to determine that a file of a directory is being changed by a file system access operation for a first time since the last backup, and upon determining that the file is being changed by the file system access operation for the first time since the last backup, placing the file in a queue, and servicing the queue in background to update a directory tree modification attribute of the directory.

11. The system of claim 9, wherein the directory tree modification attribute of a directory hierarchy indicates a modification time of the directory hierarchy.

12. The system of claim 11, wherein evaluating the directory tree modification attribute of a directory hierarchy includes comparing the modification time of the directory hierarchy to a time of the last backup to determine whether or not any file in the directory hierarchy has been changed since the last backup.

13. The system of claim 11, wherein the processor includes a data processor executing a computer instructions to update the modification time of each of the directory hierarchies in response to changes in files in said each of the directory hierarchies so that the modification time of said each of the directory hierarchy indicates a most recent time that any file in said each of the directory hierarchy has been changed.

14. The system of claim 11, wherein a directory is associated with a directory inode, wherein the directory inode of the directory includes a tree modification time and a pointer to a list of changed files in the directory.

15. The system of claim 9, further comprising fifth logic, for execution by the processor, to perform an operation in background for copying the list of changed files to a backup storage.

* * * * *